(12) United States Patent
Zhou et al.

(10) Patent No.: US 11,644,603 B2
(45) Date of Patent: May 9, 2023

(54) SPECIAL-SHAPED PLANE MIRROR

(71) Applicant: MLOptic Corp, Redmond, WA (US)

(72) Inventors: Wei Zhou, Sammamish, WA (US);
Rong Ji, Nanjing (CN); Jiang He,
Nanjing (CN); Weida Liu, Nanjing
(CN)

(73) Assignee: MLOptic Corp., Redmond, WA (US)

( * ) Notice: Subject to any disclaimer, the term of this patent is extended or adjusted under 35 U.S.C. 154(b) by 42 days.

(21) Appl. No.: 17/549,619

(22) Filed: Dec. 13, 2021

(65) Prior Publication Data

US 2022/0268978 A1   Aug. 25, 2022

(51) Int. Cl.
*G02B 5/09*   (2006.01)

(52) U.S. Cl.
CPC ..................... *G02B 5/09* (2013.01)

(58) Field of Classification Search
CPC .......................................................... G02B 5/09
USPC ....... 359/838, 850, 854, 857, 861, 866, 851, 359/855
See application file for complete search history.

(56) References Cited

U.S. PATENT DOCUMENTS

| | | | |
|---|---|---|---|
| 518,382 A * | 4/1894 | Wiederer | |
| 569,503 A * | 10/1896 | Keyes | |
| 838,047 A * | 12/1906 | Nichols et al. | |
| 896,658 A * | 8/1908 | McGiehan | |
| 2,255,312 A * | 9/1941 | Dawson | A45D 33/32 132/288 |
| 2,279,751 A * | 4/1942 | Hensley | B60R 1/082 D12/187 |
| 3,187,629 A * | 6/1965 | Rowell | A47G 1/04 359/855 |
| 3,972,601 A * | 8/1976 | Johnson | G02B 5/08 428/912.2 |
| 4,019,812 A * | 4/1977 | Gamine | B60R 1/081 359/854 |
| 4,119,107 A * | 10/1978 | Pinzone | A45C 11/00 359/860 |
| 4,775,231 A * | 10/1988 | Granzow | G02B 7/1824 359/860 |
| 7,329,016 B1 * | 2/2008 | Shonk | A47G 1/04 362/135 |
| 7,517,100 B2 * | 4/2009 | Englander | B60R 1/06 359/851 |

* cited by examiner

*Primary Examiner* — Ricky D Shafer
(74) *Attorney, Agent, or Firm* — Tracy Jong Law Firm; Tracy P. Jong; Cheng Ning Jong

(57) ABSTRACT

A special-shaped plane reflecting mirror including a first reflecting mirror, a second reflecting mirror, a third reflecting mirror, a fourth reflecting mirror and a fifth reflecting mirror; wherein the second reflecting mirror and the fourth reflecting mirror are constructed the same and symmetrically arranged on both sides of the first reflecting mirror, the third and fifth reflecting mirrors have the same structure and are arranged symmetrically on both sides of the first reflecting mirror, the first reflecting mirror is placed at an angle of 45° with the horizontal plane, and the second reflecting mirror. The first mirror is placed at an angle of 45° with the horizontal plane, the angle between the reflection surface of the second mirror and the reflection surface of the first mirror is 165°, and the angle between the reflection surface of the third mirror and the reflection surface of the first mirror is 163°.

4 Claims, 4 Drawing Sheets

SPECIAL-SHAPED PLANE MIRROR

PRIORITY CLAIM AND RELATED APPLICATIONS

This non-provisional application claims the benefit of priority from Chinese Pat. App. No. 202120380344.5 filed on Feb. 19, 2021. Said application is incorporated by reference in its entirety.

BACKGROUND OF THE INVENTION

1. The Field of the Invention

The present invention relates to a special-shaped plane reflecting mirror.

2. Background Art

In order to improve the visual sensory experience and human body adaptability of AR/VR glasses, the optical field of view of the product continues to increase, and the overall volume structure of the glasses continues to shrink. The extreme geometrical space limitations of the terminal products make the optical quality measurement close to the edge field of view impossible to achieve through the traditional linear lens and pure flat mirror, resulting in the verification of key performance indicators in the product design process, and it becomes a problem in mass production. An important factor affecting yield and cost.

SUMMARY OF THE INVENTION

The present invention addresses the problem of using linear lenses and simple plane mirrors in the prior art where it is impossible to measure the optical quality of AR/VR glasses with a large field of view and a compact spectacle frame near the edge field of view by providing a special-shaped plane mirror. The special-shaped plane mirror includes a first mirror, a second mirror, a third mirror, a fourth mirror and a fifth mirror, wherein the second mirror and the fourth mirror have the same structure and symmetrically arranged on both sides of the first mirror, the third mirror and the fifth mirror having the same structure and are arranged symmetrically on both sides of the first reflecting mirror, the first mirror is placed at an angle of 45° with the horizontal plane, the angle between a reflecting surface of the second mirror and a reflecting surface of the first mirror is 165° and the angle between a reflecting surface of the third mirror and a reflecting surface of the first mirror is 163°.

Wherein, the included angle between the mirror normal of the second mirror and the mirror normal of the third mirror is 177.23°. The second mirror and the third mirror are both trapezoidal. The two upper bottom angles of the second reflector are 150° and 30° and the two lower bottom angles of the third reflector are 125° and 55°.

PARTS LIST

1—special-shaped plane mirror
2—AR/VR glasses
3—first mirror or first reflecting mirror
4—second mirror or second reflecting mirror
5—third mirror or third reflecting mirror
6—fourth mirror or fourth reflecting mirror
7—fifth mirror or fifth reflecting mirror
8—flat mirror

PARTICULAR ADVANTAGES OF THE INVENTION

The present invention uses a special-shaped mirror to solve the problem of the limitation of the optical quality test of AR/VR glasses with a large field of view. By adopting the method of reflecting on different spatial planes for the specific field of view to be detected by the AR/VR glasses, the light of the field of view to be measured is projected out of the overall frame of the glasses, which essentially solves the problem of the large field of view of AR/VR glasses and the geometric space limitations of the compact glasses frame, thus realizing the improvement of AR/VR glasses and hence the purpose of optical quality measurement near the edge of the field of view.

DETAILED DESCRIPTION OF A PREFERRED EMBODIMENT

Figure 1:
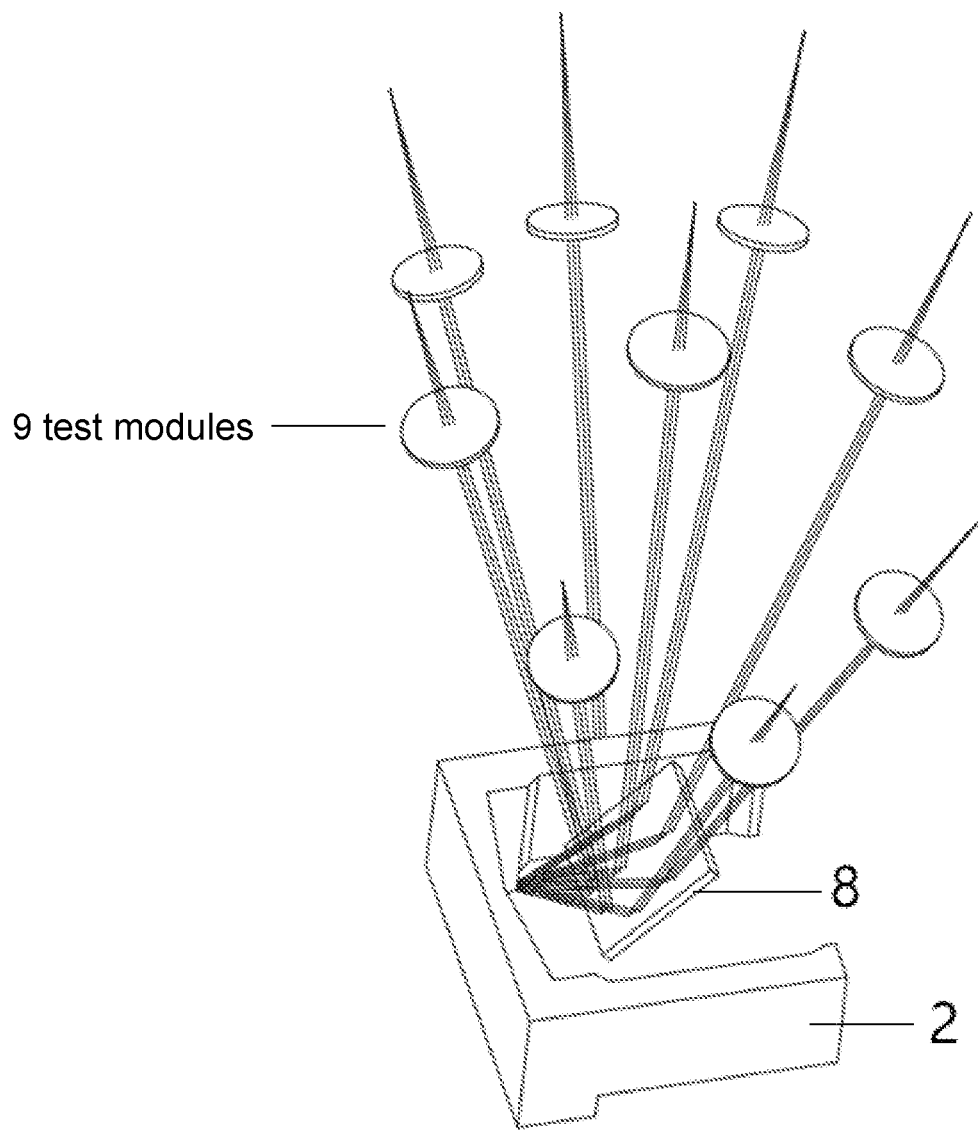
FIG. 1 is an optical principle diagram where a plane mirror is used to detect AR/VR glasses in the prior art.
Figure 2:
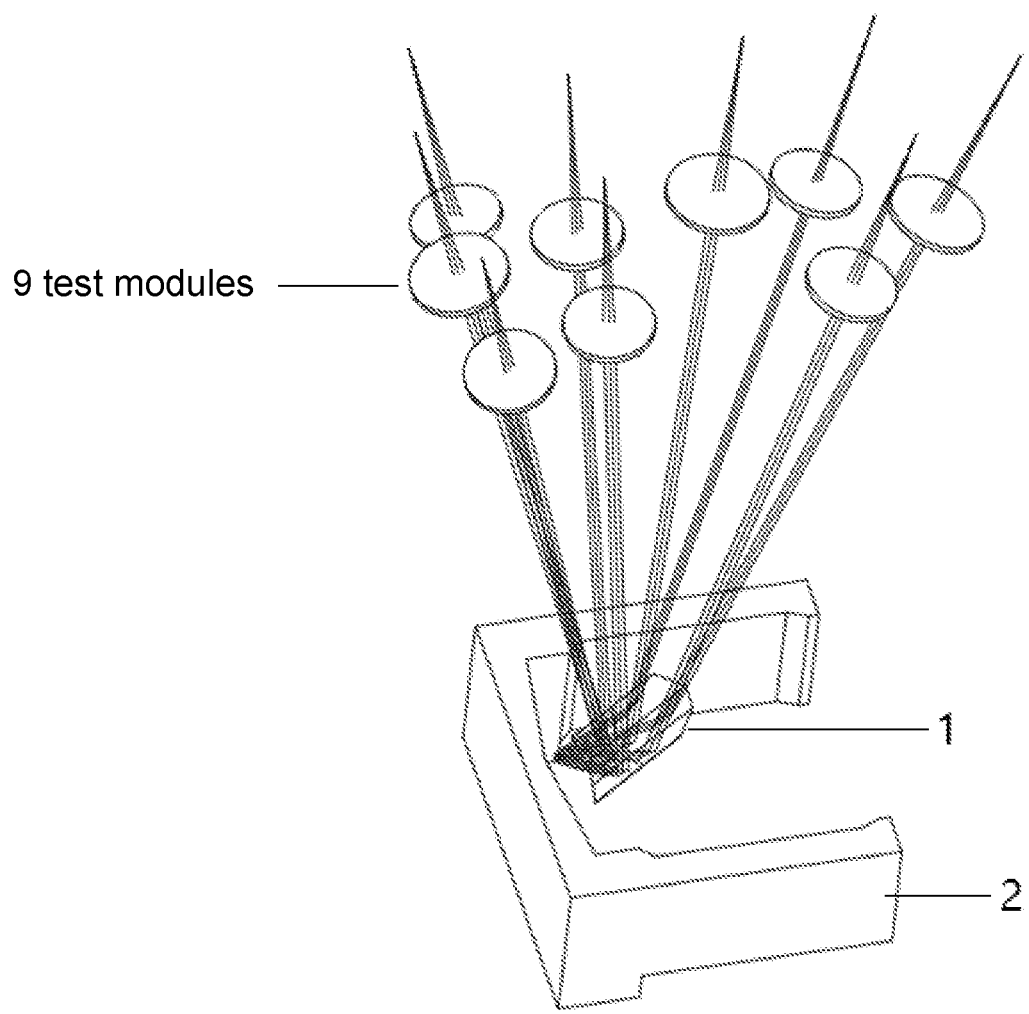
FIG. 2 is the optical principle diagram where the special-shaped mirror of the present invention is used to detect AR/VR glasses.
Figure 3:
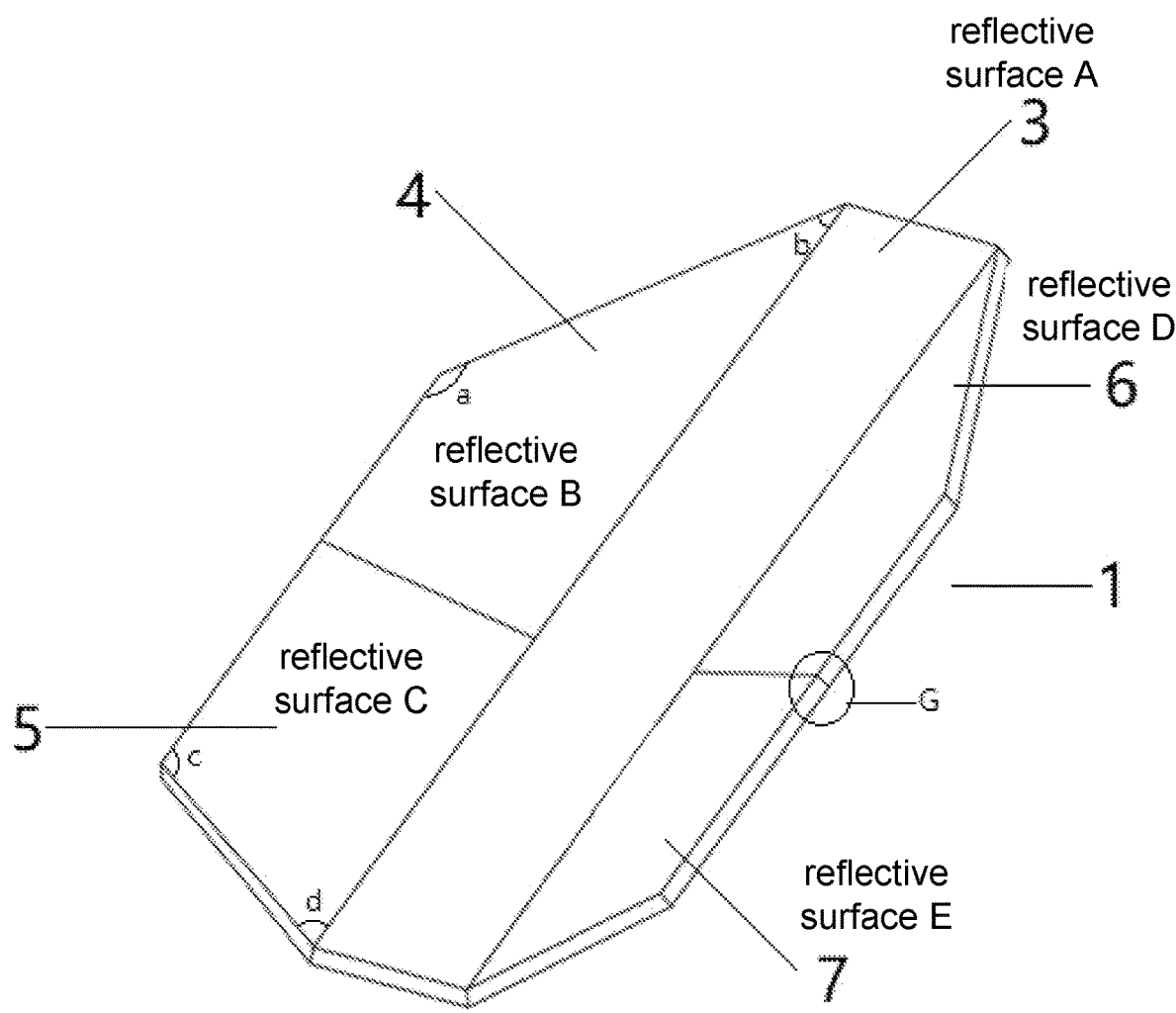
FIG. 3 is a schematic diagram of the structure of the special-shaped mirror of the present invention.
Figure 4:
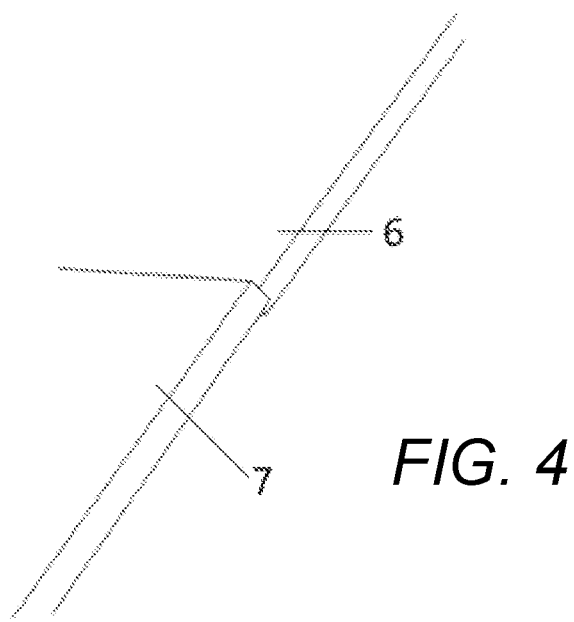
FIG. 4 is a partial enlarged view of part G of FIG. 3.

The technical scheme of the present invention will be further explained below in conjunction with the drawings. It can be seen from FIG. 1 that when the flat mirror 8 is used to detect AR/VR glasses 2, the mirror and light easily interfere with the device under test when measuring a large field of view. The 9 test modules are placed in 9 field of view positions. The layout of 9 test modules is scattered. It can be seen in FIG. 2 that when the special-shaped mirror 1 of the present invention is used to detect AR/VR glasses 2, the 9 test modules are compactly arranged and can project the light of the field of view to be measured out of the overall frame of the glasses. As shown in FIGS. 3 to 4, the special-shaped plane mirror 1 of the present invention includes a first mirror 3, a second mirror 4, a third mirror 5, a fourth mirror 6 and a fifth mirror 7. The second reflecting mirror 4 and the fourth reflecting mirror 6 have the same structure and are arranged symmetrically on both sides of the first reflecting mirror 3 (the reflecting surfaces of the second reflecting mirror 4 and the fourth reflecting mirror 6 are arranged oppositely), the third reflecting mirror 5 and the fifth reflecting mirror 7 have the same structure and are symmetrically arranged on both sides of the first reflecting mirror 3 (the reflecting surfaces of the third reflecting mirror 5 and the fifth reflecting mirror 7 are arranged oppositely). The first reflecting mirror 3 is placed at an angle of 45° with the horizontal plane. The angle between the reflection surface B of the second mirror 4 and the reflection surface A of the first mirror is 165° and the angle between the reflection surface C of the third mirror and the reflection surface A of the first mirror is 163°. The angle between the normal of the mirror surface of the second mirror 4 (reflection surface B) and the normal of the mirror surface of the third mirror 5 (reflection surface C) is 177.23°. The reflecting surfaces of the first reflecting mirror 3, the second reflecting mirror 4, the third reflecting mirror 5, the fourth reflecting mirror 6 and the fifth reflecting mirror 7 (reflecting surface A, reflecting surface B, reflecting surface C, reflecting surface D and reflecting surface E) all face the direction of incident light.

The second reflecting mirror 4 and the third reflecting mirror 5 are both trapezoidal. The upper bottom angle "a" of the second reflecting mirror 4 is 150°. The upper bottom angle "b" is 30°. The lower bottom angle "c" of the third reflecting mirror 5 is 125° and the lower bottom angle "c" is 125°. The bottom angle "d" is 55°.

What is claimed herein is:

1. A special-shaped plane mirror comprising a first mirror, a second mirror, a third mirror, a fourth mirror, and a fifth mirror, wherein the second mirror and the fourth mirror have the same structure and symmetrically arranged on opposite sides of the first mirror, the third mirror and the fifth mirror having the same structure and are arranged symmetrically on said opposite sides of the first reflecting mirror below the second and forth mirrors, the first mirror is placed at an angle of 45° with a horizontal plane, wherein an angle between a reflecting surface of the second mirror and a reflecting surface of the first mirror is 165° and wherein an angle between a reflecting surface of the third mirror and a reflecting surface of the first mirror is 163°.

2. The special-shaped plane mirror according to claim 1, wherein an angle between a normal of the second mirror and a normal of the third mirror is 177.23°.

3. The special-shaped plane mirror according to claim 1, wherein each of the second mirror and the third mirror is trapezoidal.

4. The special-shaped plane mirror according to claim 3, wherein two upper bottom angles a and b of the second mirror are 150° and 30°, respectively; and wherein two lower bottom angles c and d of the third mirror are 125° and 55°, respectively.

* * * * *